United States Patent [19]

Baker

[11] Patent Number: 4,479,215
[45] Date of Patent: Oct. 23, 1984

[54] POWER-LINE CARRIER COMMUNICATIONS SYSTEM WITH INTERFERENCE AVOIDANCE CAPABILITY

[75] Inventor: Lewin T. Baker, Schenectady, N.Y.

[73] Assignee: General Electric Company, Schenectady, N.Y.

[21] Appl. No.: 422,777

[22] Filed: Sep. 24, 1982

[51] Int. Cl.³ .............................................. H04B 7/12
[52] U.S. Cl. ..................................... 371/33; 375/100; 455/62
[58] Field of Search ............... 371/33, 8, 69; 375/100; 455/62

[56] References Cited

U.S. PATENT DOCUMENTS

| | | | |
|---|---|---|---|
| 3,349,374 | 10/1967 | Gabrielson et al. | 375/100 X |
| 3,475,684 | 10/1969 | Covill | 455/62 |
| 3,781,794 | 12/1973 | Morris | 371/69 |
| 4,241,445 | 12/1980 | Payen | 371/5 |
| 4,328,581 | 5/1982 | Harmon et al. | 371/8 |
| 4,352,183 | 9/1982 | Davis et al. | 371/33 |

Primary Examiner—Charles E. Atkinson
Attorney, Agent, or Firm—Geoffrey H. Krauss; James C. Davis, Jr.; Marvin Snyder

[57] ABSTRACT

The operating frequency of a multi-station power-line-carrier-communications system is automatically changed to avoid narrowband interference. Any one of the plurality of stations in the system can initiate a command to shift operating frequency, when the communications signal reception degrades below a predetermined criterion. An interfering signal itself can initiate a shift in operating frequency when the characteristics of the interfering signal are sufficient to deteriorate communications on an existing operating frequency.

16 Claims, 2 Drawing Figures

POWER-LINE CARRIER COMMUNICATIONS SYSTEM WITH INTERFERENCE AVOIDANCE CAPABILITY

BACKGROUND OF THE INVENTION

The present invention relates to power-line-carrier communications systems and, more particularly to a power-line-carrier communications system capable of shifting operating frequency to avoid power-line interference.

It has long been known to communicate information utilizing a power-line as the communication medium. In such a power-line-carrier (PLC) communications system, the desired signal may be interfered with by undesired signals, collectively labeled "noise", upon the power-line medium. Typically, the frequency spectrum of such noise signals, which may be of narrowband noise nature generated by appliances and other communications systems connected to the power-line, is not known at the time of system installation. Even if known, this noise spectrum may change with time, as new power-line loads and power-line-utilizing devices are added and existing loads and devices change characteristics with changes in the applicable environment. There is thus always a risk that an interferring signal will be present at the PLC system operating frequency and will greatly degrade the reliability of PLC communications.

Hitherto, two distinct alternative approaches have been utilized in an attempt to increase the signal-to-noise ratio of the PLC signal with respect to noise signals. The first approach is the so-called "narrowest band" approach, in which the desired baseband signal is communicated over the narrowest possible frequency bandwidth, so as to remove as much of the potential interference as possible by narrow bandpass filtering. This approach is often adequate if the interference encountered is not concentrated in the band of communication frequencies actually in use. The remaining approach is the so-called "spread spectrum" approach, wherein the baseband signal is deliberately mapped over a much greater frequency band than would normally be required for transmission thereof. This spread spectrum approach is advantageous if the interference across the band is uncorrelated to the PLC communication signal. However, spread spectrum PLC systems are susceptible to correlated broadband interference and carriers, to an extent dependent upon the manner in which the spread spectrum modulation is implemented and the nature of the interfering noise signal. Further, a spread-spectrum PLC system frequently does not provide filtering before the active receiving circuitry, whereby a strong interfering carrier (having a frequency located in any portion of the spread-spectrum frequency band) can completely disrupt PLC communications by saturation of the PLC receiver input circuitry. Accordingly, it is highly desirable to improve the reliability of power-line communications in the presence of man-made interference and other noise.

BRIEF SUMMARY OF THE INVENTION

In accordance with the invention, a power-line carrier communications system having an interference avoidance capability includes a plurality of stations each having a data transmitter and a data receiver, each simultaneously programmable to the same one of a plurality of communications frequencies. A message to be sent is initially transmitted by a source station on a first one of the plurality of frequencies and, if not received by another (destination) station and acknowledged thereby, is retransmitted a predetermined number of times on that first frequency. If acknowledgement of the message is not received after the predetermined number of transmissions on the initial frequency, the transmitting station sends a message to all stations to change the system frequency to the next one of the plurality of frequencies. Message transmission is then attempted at the new frequency. If acknowledgement is not received after the predetermined number of attempts at the new frequency, the transmitting station sends a message to again change frequency and reattempts to send the data message. If all attempts at all frequencies fail, the system returns to the initial frequency and waits a predetermined time interval before again attempting to send the original data message. Interference on the transmission medium thus causes the system to shift to a new frequency and avoid the interference carrier.

In a presently preferred embodiment, a stable master oscillator is used with frequency synthesizing means in both the transmitter and receiver of each station to establish the frequencies of the sequence. Data is transmitted with error coding, and each receiver includes means for error detection and processing to facilitate interference avoidance frequency changes as required.

Accordingly, it is an object of the present invention to provide a power-line-carrier data communications system capable of avoiding interfering signals by changing the PLC system operating frequency.

This and other objects of the present invention will become apparent upon consideration of the following detailed description, when read in conjunction with the drawings.

DETAILED DESCRIPTION OF THE INVENTION

Figure 1:
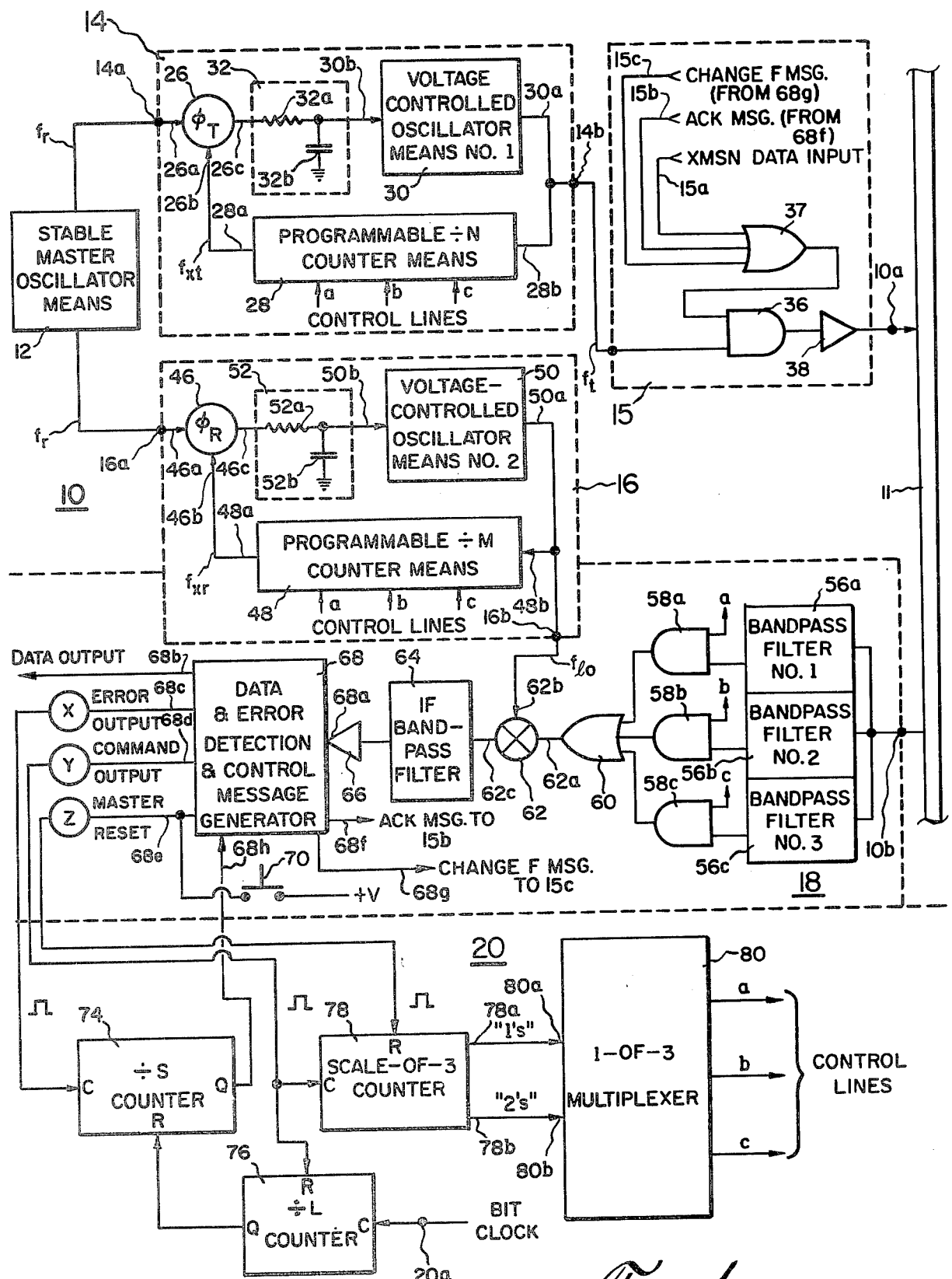
FIG. 1 is a schematic block diagram of a power-line carrier communications station for use in a communication system having a plurality of such stations interconnected by a power-line communications medium.

Referring initially to FIG. 1, I have recognized that a substantial portion, if not all, of the noise on a power-line communications medium is man-made, is correlated, and is typically in the form of carriers from other communication systems. Accordingly, a power-line-carrier (PLC) communications system which dynamically avoids bands of interference, by slow frequency hopping of the carrier signal, will be of advantage. The PLC system utilizes a plurality of transmitting/receiving stations 10, each connected to the common power-line communications medium 11. Each station 10 includes a highly stable master oscillator means 12 producing a signal at a reference frequency $f_r$. The reference frequency is utilized in a transmission-frequency synthesizing means 14 to provide a transmission frequency $f_t$ signal which is then modulated, as by binary digital data and the like, in a transmitter means 15. The modulated signal is coupled from a station transmitter output port 10a to the system transmission medium 11.

The reference frequency $f_r$ from oscillator means 12 is also utilized in a reception-frequency synthesizing means 16 for generation of a local oscillator frequency $f_{lo}$. The local oscillator signal is supplied to a PLC receiving means 18 for facilitating reception of a PLC signal present at a reception input 10b from the system medium 11. Each data packet provided at the transmission data input 15a of means 15 is provided with error detection coding bits, so that transmission errors can be detected in a receiving unit 18 of a recipient station 10. Each data packet transmitted requires an acknowledgement, as by a return message introduced at transmitter input 15b, upon receipt by the intended receiving station 10. In the absence of an acknowledgement of receipt (ACK) signal, the transmitting station 10 will retransmit the data packet until the first occurring one of: receipt of an ACK signal, or a predetermined number of transmissions without receipt of the ACK signal. If a data packet is transmitted the predetermined number of times without receipt of the ACK signal, the transmitting station then receives, at input 15c, a command to be transmitted over medium 11 to all stations 10 in the system. The command causes all stations 10 to change frequency to the next frequency in a pre-established sequence containing a plurality K of operating frequencies. The packet is retransmitted thereafter. If the packet is still not received and acknowledged, the transmitting station again sends a system-wide frequency-change message and again attempts to transmit the original message. If the ACK signal is not received after cycling through the entire set of the plurality of predetermined frequencies, all stations 10 return to the initial frequency and wait until the system noise characteristics alter such that communication can be resumed. Advantageously, the signal utilized to command all stations in the system to advance to the next predetermined frequency is caused to resemble the most likely interference signal expected, so that the presence of such interference will itself cause a change in system frequency, thereby avoiding that most likely interference signal in the event that communication is wiped out (as evidenced by lack of receipt of an AOR signal). Accordingly, each of the plurality of stations 10 includes a frequency-change controlling means 20 for determining which of the predetermined plurality of operating frequencies is to be synthesized by means 14 and 16 and thus determine the operating frequency of each of stations 10.

While a presently preferred embodiment will be described with respect to use of binary data transmission by amplitude-shift keying (wherein a binary 1 level is transmitted by turning the carrier on during a bit time interval and the binary 0 bit is transmitted by turning the carrier off during a bit time interval), it should be understood that the present invention is not limited to any particular type of modulation or coding, so long as the modulated spectrum produced is narrow compared to the total spectrum provided in the transmission medium 11 for communications purposes. Further, each of the plurality of transmitting frequencies and the corresponding receiving local oscillator frequency can be generated by a desired one of a plurality of means, including: utilizing separate pairs of crystal-controlled oscillators, with each pair being enabled for transmission and reception of each of the plurality of operating frequencies; utilizing at least one voltage control oscillator having switched control voltage, singly or in pairs, for each system operating frequency; and the illustrated use of a single crystal oscillator with a pair of programmable multipliers switched to produce the correct frequency for each of the transmitter and receiver in each of the plurality of PLC stations 10. This illustrated approach offers crystal-controlled stability at relatively low cost. In the illustrated embodiment, three preselected frequencies $f_a$, $f_b$ and $f_c$ can be selected for the transmission frequency. In particular, the frequencies $f_a = 50$ kHz., $f_b = 100$ kHz. and $f_c = 150$ kHz. are utilized by way of illustration only. An intermediate frequency of 450 kHz. is selected, by way of illustration only, for the receiving means 18 intermediate frequency.

Transmitting frequency synthesizer means 14 receives the stable master oscillator means reference frequency $f_r$ waveform at a reference frequency input 14a, for coupling to the reference frequency input of a transmission phase detector $\theta_T$ means 26. A second input 26b of the phase detector receives an unknown frequency $f_{xt}$ waveform from the output of a programmable divide-by-N counter means 28. Means 28 receives the transmission frequency $f_t$ waveform at the input thereof from an output 30a of a first voltage-controlled oscillator means 30. A phase detector output 26c provides a voltage, related to the difference in phase between the waveforms at the inputs 26a and 26b, to a loop filter 32, typically comprised of a series resistance 32a and filter capacitance 32b, for application to a frequency-controlling input 30b of the voltage control oscillator means 30. The divisional number N of programmable counter means 28, and therefore the frequency of the oscillator means waveform as a multiple N of the master oscillator reference frequency, is controlled by enablement of one of a plurality K of counter means control lines, e.g. three control lines a, b and c, respectively setting N=1, 2 or 3, when the reference frequency $f_r$ is 50 KHz., in the illustrated embodiment. In the illustrated amplitude-keyed transmitter embodiment, transmitter section 15 utilizes an AND gate 36 to gate the $f_t$ transmission waveform by the binary value of the binary data at the output of an OR gate 37, allowing whichever one of transmission data inputs 15a, 15b or 15c then enabled to modulate the carrier. The modulated carrier is applied for application to a transmission amplifying means 38. The amplitude-keyed waveform is then coupled from station output 10a to power-line transmission medium 11.

The receiving frequency synthesizer means 16 also receives the stable master oscillator reference frequency $f_r$ signal at an input 16a thereof, for application to a reference frequency input 46a of a receiving synthesizer phase detector $\theta_R$ means 46. Another input 46b of phase detector 46 receives the divided frequency $f_{xr}$ waveform from the output 48a of a programmable divide-by-M counter means 48, having an input 48b connected to the output of a second voltage-control oscillator means 50. The second voltage control oscillator means output 50a provides the local receiving oscillator frequency $f_{lo}$ signal to receiving means 18, with the frequency controlled by the voltage at a frequency control input 50b. The voltage applied to input 50b is obtained from the output 46c of the phase detector, via a loop filter means 52, typically comprising a series filtering resistance 52a and a shunt filtering capacitance 52b. The counter means 48 division ratio M is established to one of the plurality K of preset values (e.g. three values—12, 11 or 10) by enablement of one of a like number K of second counter means control lines a, b or c, coupled in parallel to the first counter means 28 control lines, e.g. lines a, b and c, respectively.

Receiving means 18 receives the signal at station receiving input 10b from the power-line media 11. The incoming signal is coupled in parallel to each of a plurality of bandpass filters 56, equal in number to the number K of system frequencies, e.g., three, in the illustrative example. The output of each bandpass filter is connected to one input of a two-input AND gate 58, having the other input thereof connected to an associated one of the plurality of control lines. Thus, in a system wherein three frequencies are utilized with three control lines a, b and c, first second and third bandpass filters 56a, 56b and 56c are utilized, with three AND gates 58a, 58b and 58c. The output of each of gates 58 is coupled to a different input of a K-input OR gate 60, where K is the number of the frequencies to be utilized in the system. The output of gate 60 is connected to the received signal input 62a of a frequency-mixing means 62, which also receives the local oscillator frequency $f_{lo}$ signal, at a local oscillator input 62b, from the output 16b of the receiving frequency synthesizer means 16. The sum and difference products of the received and local oscillator frequencies is provided at a mixer output 62c. The desired one of the sum and difference mixing frequencies, e.g. the sum frequency, is selected by an intermediate-frequency (IF) bandpass filter means 64 and is then amplified by suitable amplifying means 66. The amplified intermediate-frequency received signal is applied to the input 68a of a data and error detection and control message generator means 68. Means 68 not only recovers the encoded data, for presentation at a data output 68b, but also includes means for detecting data errors and for generating an acknowledgement message when a data packet is received without error. The means for detecting an error in a packet and for generating an acknowledgement message, in response to receipt of valid data, is not shown, being known to the art.

Means 68 also provides an output 68c at which an error output X signal is provided if either a data packet error is detected, responsive to the particular error coding utilized when the station is in the receiving mode, or if an acknowledgement message is not received in the transmitting mode. Another output 68d provides a command output Y signal if the shift-frequency command is received via medium 11 from any of the remaining stations 10 in the system. A fourth output 68e provides a master reset signal Z when a system-wide command is received to return to the first frequency, i.e. that frequency established by energization of control line a. A press-to-reset switch means 70 may be utilized for connection of a potential, e.g. positive operating potential +V, in a wired-OR configuration with output 68e, to manually master-reset the station. A fifth output 68f provides an acknowledge message generated when a valid data packet is received. A sixth output 68g provides a change-frequency message responsive to a counter 74 having counted S error output signals X. The X, Y and Z signals are provided to an interference-avoidance frequency control means 20.

Means 20 utilizes a divide-by-S counter means 74 having a clock C input receiving the error output X signal. A bit clock signal, generated in the data timing section (not shown) of the station, is provided to a control means input 20a and applied to the clock C input of a divide-by-L counter 76, also having a Q output connected to the reset R input of counter means 74. The Q output of counter means 74 is connected to an input 68h of means 68. The master reset Z signal is connected to a reset R input of a counter means 78. Counter means 78 provides a plurality of outputs, e.g. first and second outputs 78a and 78b respectively referred to as the "1's" and "2's" outputs, each to an associated input 80a or 80b of a 1-of-K multiplexer means 80. Multiplexer 80 provides K mutually exclusive control line outputs, e.g. the three a, b or c outputs, responsive to the signals received from counter means 78. Thus, responsive to a master reset Z signal, counter 78 is reset and neither output 78a nor 78b is energized, whereby multiplexer 80 energizes the first control line a.

The divisor L is selected to allow the counter 74 to be active for the total length of S data packet transmission attempts (S intervals each as long as a data packet transmission plus a following acknowledgement time interval). If the station is in the receiving mode and the time (equal to L bits) for S transmission attempts passes without an error output X signal, then there is no need to shift frequency. If, however, before L bit intervals pass, there occurs S errors (with each error output X signal occurring when a packet transmission attempt has failed and erroneous data is received) it must be because all S attempts at that frequency have failed and that the transmitting station (not receiving an acknowledgement) will be shifting to the next frequency. Accordingly, the Q output of counter 74 is enabled to cause a frequency-change command for the receiving station(s) to also shift to the next of the plurality of frequencies. In the transmitting mode, the station receiver monitors the transmission of the station transmitter onto medium 11 and determines if an acknowledgement message is received within the predetermined time interval after the end of a transmission. If this acknowledgement message is actually received, the count in counter 74 is reset by counter 76. If the acknowledgement message is not timely received, the output X signal is pulsed and the count in counter 74 increases by 1; after S attempts, the Q output of counter 74 is enabled and the frequency-change command is generated at output 68g of means 68. Responsive to either a received frequency-change command from another station or to enablement of the Q output of counter means 74, means 68 outputs a Y signal to both counter means 78 and counter means 76. The counter means 78 is incremented to enable the "1's" output 78a and thus enable the control line b and change the communications frequency. Responsive to another S attempts to transmit a data packet at thw new frequency, or to a received frequency-change command, means 68 outputs a Y signal and counter 78 is again incremented to enable the "2's" output 78b and thus enable control line c.

It will be seen that a strong interfering signal will provide a signal having a non-zero amplitude at the frequency in use, whereby a binary 1 will be detected for at least one of the binary 0 bits in each data word. The error detecting means 68 will thus issue an error message and prevent an AOR signal from being generated, whereby retransmission at the same or a different system frequency will be attempted. Thus, a strong interfering signal will either be interpreted, after S attempts, by all stations 10 as a command to change operating frequencies, or will immediately be interpreted as a change-frequency command, dependent upon the characteristics of the interfering signal. Additionally, any station 10 having interference problems can also generate a command signal to change the operating frequency (which signal will be detected and utilized to provide a command output Y signal). The transmitting station 10, after S unacknowledged attempts to transmit a data packet, sends a "change frequency" message, e.g. a continuous logic 1 sequence for several bit periods. If the data is sent by amplitude shift keying, or most other forms of modulation, the transmitted signal will have the same characteristics as narrowband noise, but will have greater amplitude than the narrowband noise normally seen at the frequency then in use. Upon receiving a strong narrowband signal on the operating frequency, all station receivers respond with a command output Y signal and cause the stations to shift their operating frequency to the next one of the plurality of preset frequencies and then allow the transmitting station to attempt to establish communications to the intended receiving station.

There is a remote possibility that at least one of the stations 10 might interpret a moderately strong interfering signal as a signal to change frequencies, even when one or more other stations 10 do not so interpret that signal. There is also a remote possibility that at least one of the stations 10 might not recognize a signal generated by a data station which has become isolated on a frequency different from the remainder of the stations in the system. The system automatically corrects for these possibilities in one of several manners. If the isolated station(s) attempts to send a message and the intended recipient station does acknowledge, no problem occurs even if both stations are isolated from the main group of stations. If the other station(s) do not receive and acknowledge the data packet, the isolated station moves to the next operating frequency after S unacknowledged attempts and sends the message again. If this next-frequency is the frequency of the main group of stations, the above-described sequence of reception/acknowledgement or change-frequency-command will occur. If this next-frequency is not that of the main group, the isolated station again changes its operating frequency after S unacknowledged attempts. Eventually, the transmitting station will rotate through all of the frequencies until it reaches the one being utilized by the main group of stations. Conversely, if one of the stations in the main group attempts to send a message to the isolated station, the message will not be acknowledged and, after S unacknowledged attempts, the transmitting station will generate a change-frequency command and that station (and all of the other stations in the main group) will move to the next operating frequency. Therefore, after repeated attempts to send a message to the isolated station, the main group of stations will all rotate together through the preset frequencies to reach the frequency of the isolated station. In the event that there are no messages to be sent to or from the isolated station, the main group of stations will continue to communicate with each other and incidental errors during main group communication will cause the main group of stations to slowly rotate through the plurality of frequencies and in time pick up the isolated station. It should be understood that one station may be designated as a master station, to generate a universal command to return to a predetermined frequency, if the system error rate reaches an unacceptable level; the master station will advantageously transmit the "return to designated frequency" command successively on all of the plurality of frequencies to "round up" any isolated stations.

Figure 2:
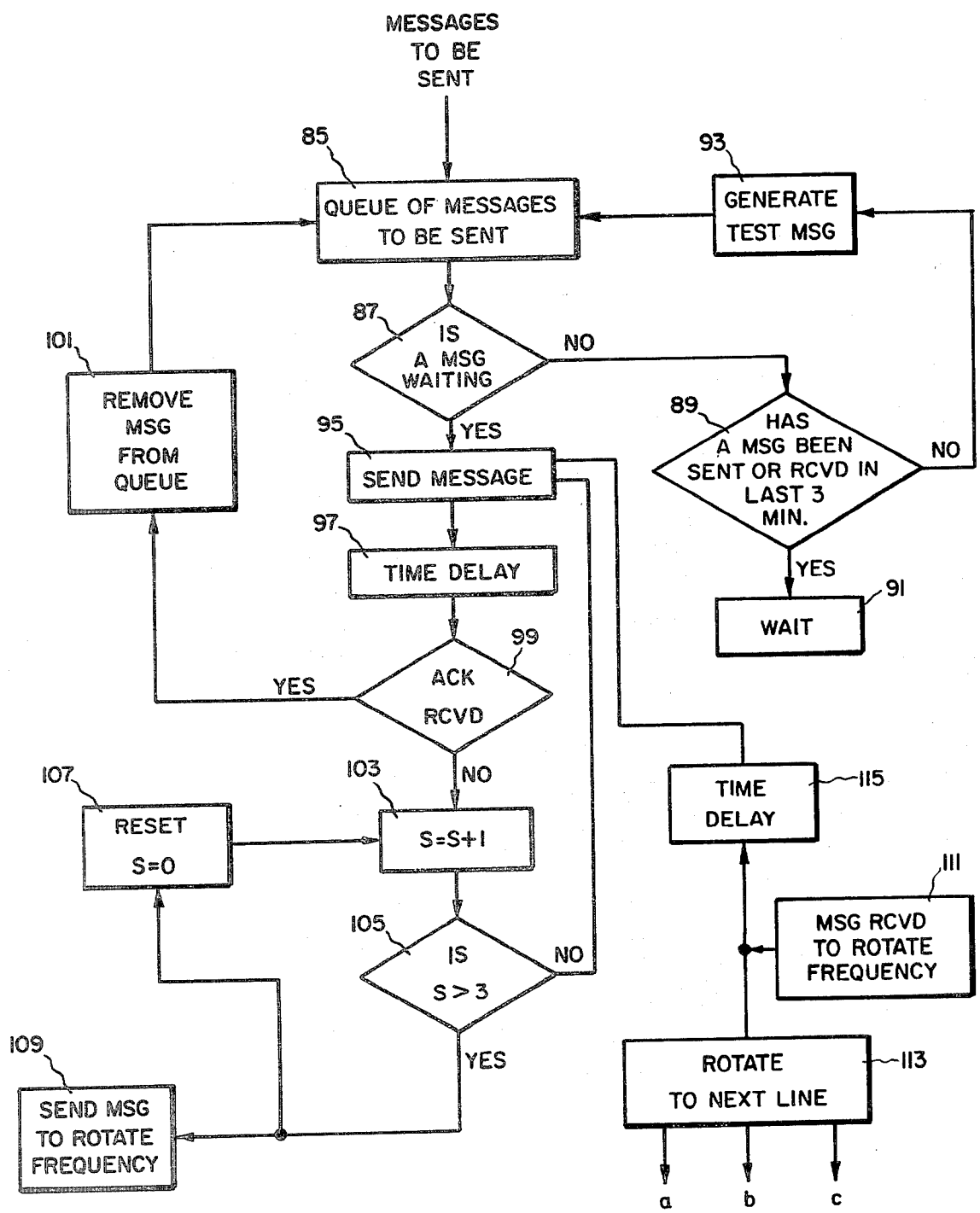
FIG. 2 is a flow diagram illustrating the operations to be carried out when a microcomputer is utilized for a portion of the data and error detection and processing means of the station of FIG. 1.

Referring now to FIG. 2, if a microcomputer is utilized as part of the error detection and processing means 68, that microprocessor will be utilized both for reception and transmission control. Thus, each message to be transmitted will be stored in a queue of messages to be sent, in step 85. The microcomputer checks its message queue memory, in step 87, to determine if a message is waiting to be sent. If a message is not waiting, the microcomputer checks a memory section devoted to the immediate past history of operation and determines if a message has been sent or received in a previous, predetermined time interval, e.g. the last three minutes; this check is done in step 89. If a message has been sent or received in the last preselected time interval, the microcomputer proceeds to step 91 and waits for reception of an incoming message (either an ACK acknowledgement or an incoming data message). If a message has not been sent or received in the last predetermined period, step 93 is entered and a test message is generated, to check the system and determine if interference has decreased and/or if the integrity of the system is intact. If, in step 87, a message was found to be waiting in the queue, the message is then sent in step 95. After completion of the message, a time delay is enabled, in step 97, while the acknowledgement ACK message is awaited. After the time delay of step 97, step 99 checks for receipt of the ACK message. If acknowledgement is received, the message just transmitted is removed from the queue, in step 101, and step 85 is reentered to check the queue for additional messages to be sent. If an acknowledgement is not received in step 99, step 103 is entered and the number of times S that a particular message has been sent is incremented by one. Thereafter, step 105 is entered and the number of transmission times S is checked. If the message has not been sent more than three times, step 105 is exited and, after resetting the attempts S count to 0 in step 107, a message is sent to all stations 10 on the system to rotate to the next frequency, in step 109. When a station receives the rotate (or change) frequency message, in step 111, the command output Y signal is provided, incrementing the count in counter 78 and enabling the next control line output of multiplexer 80, as provided for in step 113, to select that one of control lines a, b and c to be then enabled. Simultaneously therewith, the output of step 111 is time delayed in step 115 and then causes step 95 to be entered and the message retransmitted.

While one presently preferred embodiment of my novel power-line-carrier communications system with interference avoidance capability has been described in some detail herein, many modifications and variations will now become apparent to those skilled in the art. It is my intent, therefore, to be limited only by the scope of the appending claims and not by the specific details and instrumentalities set forth by way of description herein.

What is claimed is:

1. A system for communicating data over a medium, comprising:

a plurality of data stations each having means coupled to said medium for receiving a carrier therefrom to recover that one of a data word and acknowledgement message modulated upon said carrier; and means for transmitting via said medium a carrier modulated with a selected one of a data word and an acknowledgment message responsive to receipt of a data word in said receiving means; each of said transmitting and receiving means simultaneously programmable to the same one of a plurality K of communications carrier frequencies;

means cooperating with each transmitting and receiving means for causing a data packet to be transmitted a predetermined number S of times; said causing means being disabled if an acknowledgment message is received after any one of the data packet transmissions;

means in each station and responsive to said causing means for changing the communications carrier frequency to the next one of said plurality K of communications carrier frequencies if all predetermined number S of transmissions on a previous one of said plurality K of frequencies are not acknowledged; and means for resetting said causing means to cause the transmitting means to transmit said data packet for an additional predetermined number of times on the next selected carrier frequency.

2. The system of claim 1, wherein said frequency changing means is enabled to reset said frequency to the first used one of said plurality of frequencies, after said predetermined number S of transmissions of said data word without acknowledgement on each of the plurality K of carrier frequencies.

3. The system of claim 1, wherein each station receiving means further includes a plurality of bandpass filters, each tuned to an associated one of the plurality K of carrier frequencies, each filter having an input connected to said medium and an output; and means for connecting the remainder of the receiving means to only the output of that filter for the single carrier frequency then in use.

4. The system of claim 3, wherein each receiving means includes a common intermediate-frequency amplifier; a mixing means, receiving the bandpass-filtered signal from said connecting means and a local oscillator signal, for providing an intermediate-frequency signal to the intermediate-frequency amplifier; and frequency synthesizing means for providing the local oscillator signal at a frequency responsive to carrier frequency selection information from the frequency changing means.

5. The system of claim 1, wherein said causing means includes means for detecting a data packet transmitted over said medium and for detecting an error in said data packet; and means for counting the number of errors detected by said detecting means and for providing a signal to said changing means to change carrier frequency only after S errors are detected by said detecting means.

6. The system of claim 5, wherein said resetting means also resets said counting means after a time interval predeterminatly established to allow S unacknowledged attempts to transmit a data word.

7. The system of claim 1, wherein the transmitting means of at least one station is adapted to transmit a command to change frequency, and wherein all station receiving means are adapted to detect said change command to provide a command output signal.

8. The system of claim 7, wherein the changing means also responds to said command output signal to change carrier frequency.

9. The system of claim 1, wherein at least one station is adapted to transmit a reset command, and wherein all station receiving means are adapted to detect said reset command to provide a reset output signal.

10. The system of claim 9, wherein the changing means also responds to said reset output signal to change carrier frequency to a preselected one of said plurality K of frequencies.

11. A method for communicating data between a plurality of stations interconnected by a medium, comprising the steps of:

(a) transmitting a data message from a transmitting one of the stations over the medium on a first one of a plurality K of predetermined frequencies;

(b) recovering the data message from a signal received from the medium at a receiving one of the plurality of stations;

(c) transmitting an acknowledgement message from the receiving one of said stations onto the medium;

(d) recovering the acknowledgement message upon receipt from the medium at the transmitting one of the plurality of stations;

(e) repeating step (a) up to S times if the acknowledgement message is not received at the transmitting station within a predetermined time interval after each transmission;

(f) changing frequency to a next subsequent one of the plurality K of frequencies if step (e) is completed without receipt of the acknowledgement message; and (g) repeating steps (a) and (e) sequentially, for all K of the frequencies, if the acknowledgement message recovery step (d) does not occur within the predetermined time interval after each transmission.

12. The method of claim 11, further comprising the step of: (h) waiting a predetermined time interval between each repetition of steps (a) and (e)-(g), until step (d) occurs.

13. The method of claim 11, further comprising the steps of: detecting at each receiving station the number of sequential data messages received with at least one error therein; and changing frequency to a next subsequent one of the plurality K of frequencies if a predetermined number of sequential data words are detected with at least one error.

14. The method of claim 11, further comprising the steps of: transmitting from at least one of the stations a command to all stations to change frequency; recovering the change-frequency command at at least one of the plurality of stations; and changing to the next sequential one of the plurality K of predetermined frequencies, at each station recovering the change-frequency command.

15. The method of claim 14, wherein at least one potentially-interfering signal may at least periodically appear upon said medium, and further comprising the step of configuring the change-frequency command to resemble at least one of the at least one potentially-interfering signals.

16. The method of claim 11, further comprising the steps of: transmitting a master reset message from at least one of the plurality of stations; recovering the master reset message at each of the plurality of stations; and resetting the frequency of each station to the first one of the plurality K of predetermined frequencies, responsive to recovery of the master reset message.

* * * * *